(12) United States Patent  (10) Patent No.: US 8,256,492 B2
Lin  (45) Date of Patent: Sep. 4, 2012

(54) FRAME-MOUNTED SUNSHADE DEVICE

(75) Inventor: Paul Lin, Tainan (TW)

(73) Assignee: Macauto Industrial Co., Ltd. (TW)

( * ) Notice: Subject to any disclaimer, the term of this patent is extended or adjusted under 35 U.S.C. 154(b) by 78 days.

(21) Appl. No.: 12/930,654

(22) Filed: Jan. 13, 2011

(65) Prior Publication Data

US 2012/0180961 A1    Jul. 19, 2012

(51) Int. Cl.
*B60J 7/06* (2006.01)
(52) U.S. Cl. ................. 160/370.22; 296/219
(58) Field of Classification Search ............ 160/370.22, 160/271, 272, 273.1, 265, 23.1; 296/219, 296/142, 143, 97.8
See application file for complete search history.

(56) References Cited

U.S. PATENT DOCUMENTS

| | | | |
|---|---|---|---|
| 4,390,054 A * | 6/1983 | Niibori et al. ................. | 160/265 |
| 4,744,403 A * | 5/1988 | Hausmann et al. ............ | 160/272 |
| 4,923,244 A * | 5/1990 | Clenet .......................... | 296/214 |
| 5,479,979 A * | 1/1996 | Hayashiguchi ............... | 160/265 |
| 5,535,806 A * | 7/1996 | Kold et al. .................. | 160/273.1 |
| 5,595,229 A * | 1/1997 | Ouvrard ....................... | 160/23.1 |
| 6,216,762 B1 * | 4/2001 | Lin .......................... | 160/370.22 |
| 6,682,133 B2 * | 1/2004 | Glasl ......................... | 296/216.01 |
| 6,899,380 B2 * | 5/2005 | Kralik et al. .................. | 296/214 |
| 7,568,752 B1 * | 8/2009 | Lin ............................. | 296/97.8 |
| 2008/0272612 A1 * | 11/2008 | Harnischfeger et al. ..... | 296/97.9 |

* cited by examiner

*Primary Examiner* — David Purol
(74) *Attorney, Agent, or Firm* — Bliss McGlynn, P.C.

(57) ABSTRACT

A sunshade device for a vehicle includes a sunshade cloth that has two opposite lateral ends inserted respectively into two track rails, a fixed end fixed to a winding shaft assembly, and a pull end interconnecting the lateral ends oppositely of the fixed end. A cross bar is attached to the pull end and extends between the track rails. A tensioning unit includes a spring disposed within the cross bar, a buffer sleeve disposed around the spring, and two tension cords each having an intermediate section attached to one of two lateral ends of the sunshade cloth, a first end section connected to one end of the spring, and a second end section connected to the winding shaft assembly. The tension cords prevent the sunshade cloth from becoming slack.

7 Claims, 6 Drawing Sheets

FRAME-MOUNTED SUNSHADE DEVICE

BACKGROUND OF THE INVENTION

1. Field of the Invention

The present invention relates to a sunshade device and, more particularly, to a frame-mounted sunshade device for a vehicle.

2. Description of the Related Art

Various kinds of sunshade devices have been designed for mounting on a rear window, side windows and a dormer of a vehicle. Various structures have been developed for such sunshade devices.

Referring to FIGS. 1 and 2, a conventional sunshade device 1 frame-mounted on a vehicle generally includes two track rails 11 (only one is shown in the figures), a sunshade cloth 12 which can be resiliently wound around a winding shaft (not shown) and stretched out from the same, and a cross bar 13 fixed to a pull end 121 of the sunshade cloth 12, and two slide blocks 14 (only one is shown in the figures) fixed respectively to the left and right ends of the cross bar 13 and inserted slidably into the track rails 11. The track rails 11 include respectively two rail grooves 111 with open ends facing each other, and two sliding grooves 112 for receiving the respective slide blocks 14. The sunshade cloth 12 has two bent portions 122 (only one is shown in the figures) formed by folding back the edges on left and right sides thereof. The bent portions 122 are V-shaped strips bending toward each other so as to insert correspondingly into the track grooves 111 and slide along the length direction of the track grooves 111.

To extend and retract the sunshade cloth 12 along the length direction of the track rails 11, the bent portions 122 are provided on two sides of the sunshade cloth 12 in the above-mentioned sunshade device 1 such that the bent portions 122 are hooked and retained in the rail grooves 111. However, the bent portions 122 are detached easily from the track grooves 111 if the user unintentionally pushes the sunshade cloth 12 upward.

SUMMARY OF THE INVENTION

Therefore, an object of the present invention is to provide a frame-mounted sunshade device for a vehicle that can effectively prevent the detachment of the sunshade cloth.

Another object of the present invention is to provide a frame-mounted sunshade device for a vehicle with smooth extension and retraction of the sunshade cloth and a low noise.

Accordingly, a sunshade device for a vehicle of the present invention comprises two track rails respectively having rail grooves with open ends facing each other, a sunshade unit, a cross bar, and a tensioning unit. The sunshade unit includes a rewindable winding shaft assembly, and a sunshade cloth that is wound around the winding shaft assembly and that can be stretched out along a length direction of the track rails. The sunshade cloth has two opposite lateral ends inserted respectively into the rail grooves, and a pull end interconnecting the lateral ends and disposed away from the winding shaft assembly. The cross bar extends between the track rails, is attached to the pull end, and has a longitudinal through hole extending through two longitudinally opposed ends of the cross bar. The tensioning unit is disposed in the through hole and connected to the sunshade unit. The tensioning unit includes a spring disposed within the through hole, a buffer sleeve disposed around the spring, two tension cords respectively connected to two opposite ends of the spring and further connected to the winding shaft assembly, each of the tension cords having an intermediate section attached to one of the lateral ends of the sunshade cloth, a first end section connected to the spring, and a second end section connected to the winding shaft assembly.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
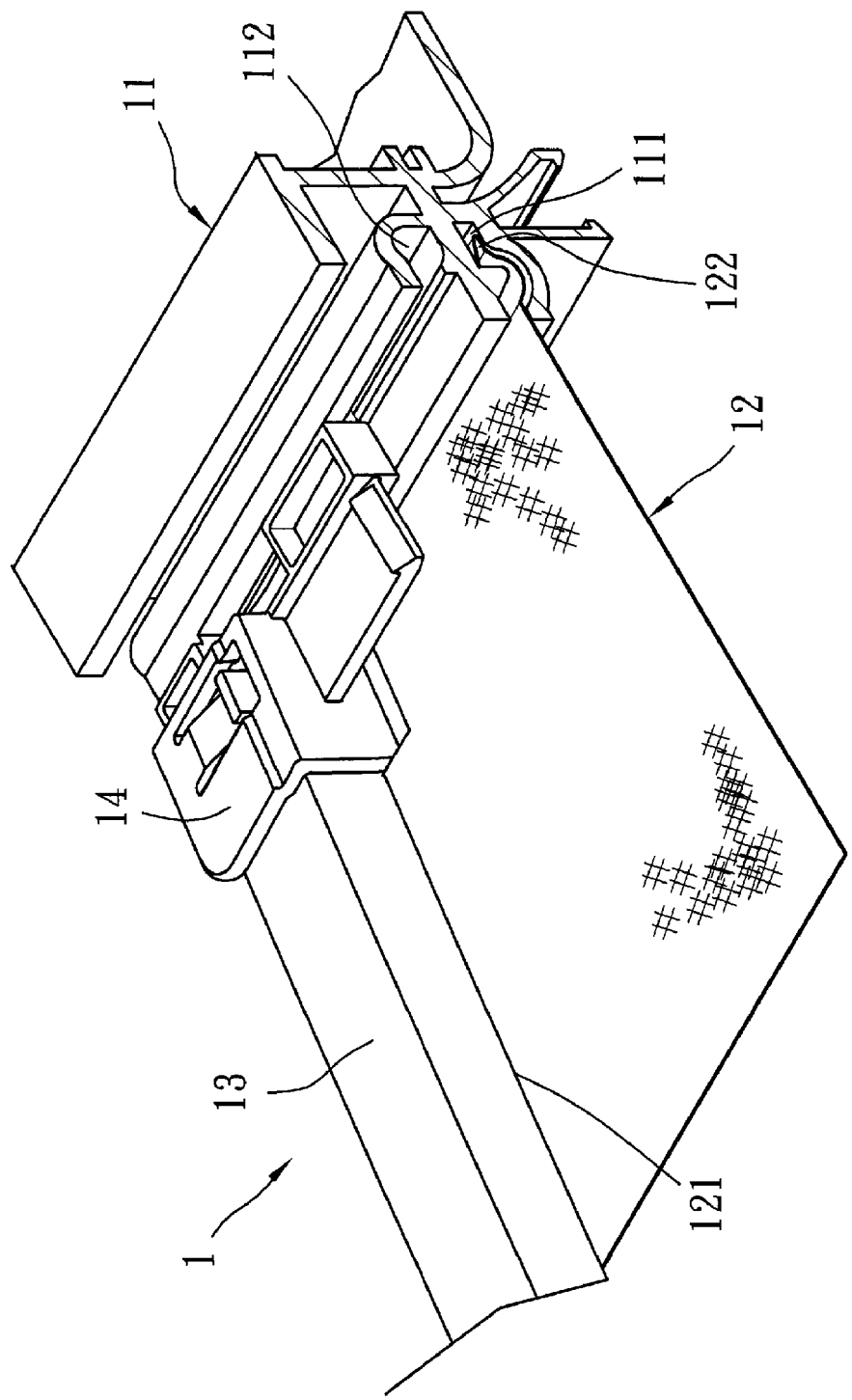
FIG. 1 is a fragmentary perspective view of a conventional sunshade device for a vehicle.
Figure 2:
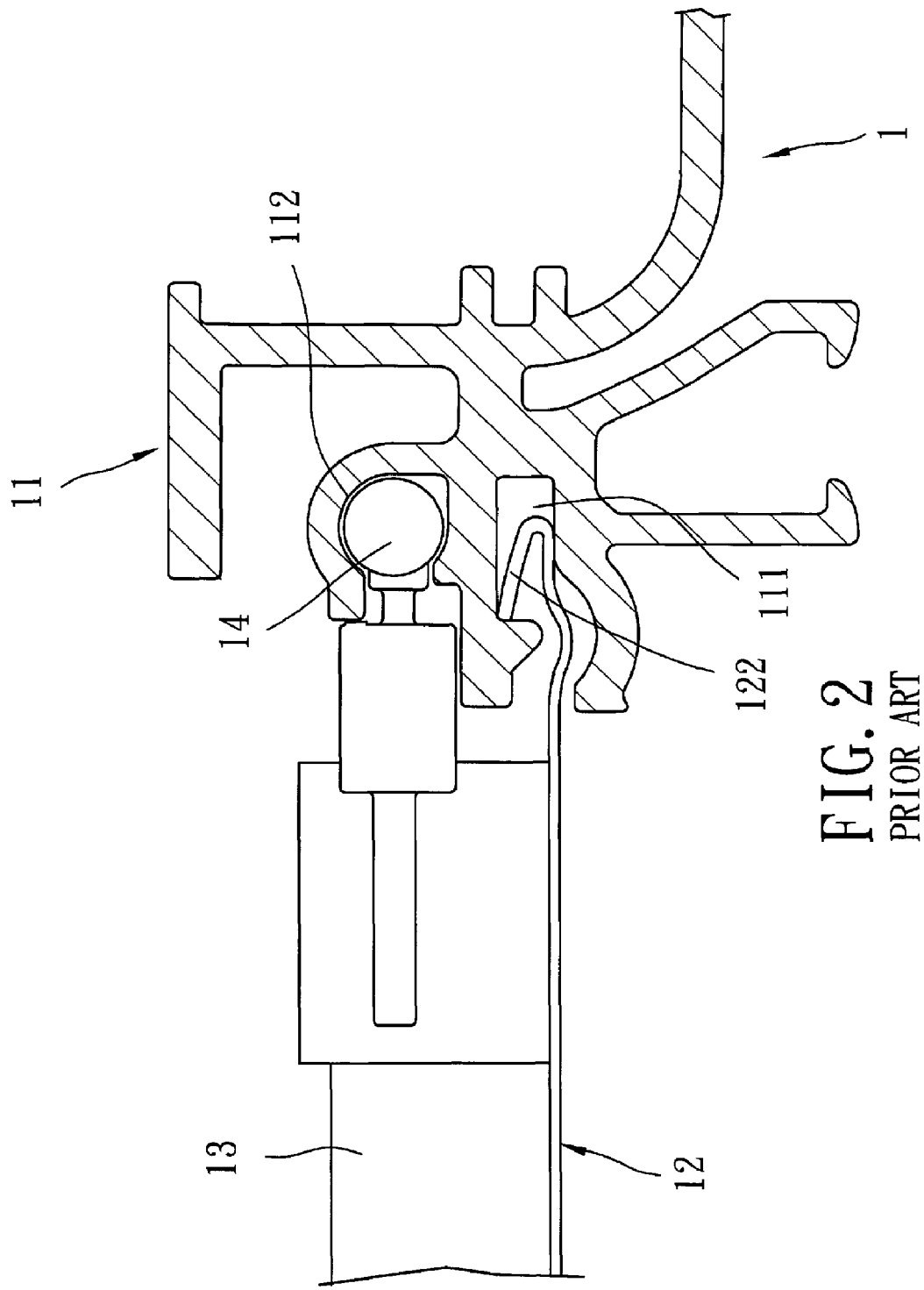
FIG. 2 is a partially cross sectional view of the conventional sunshade device for a vehicle of FIG. 1.

Before the present invention is described in greater detail, it should be noted that like components are assigned the same reference numerals throughout the following disclosure.

Figure 3:
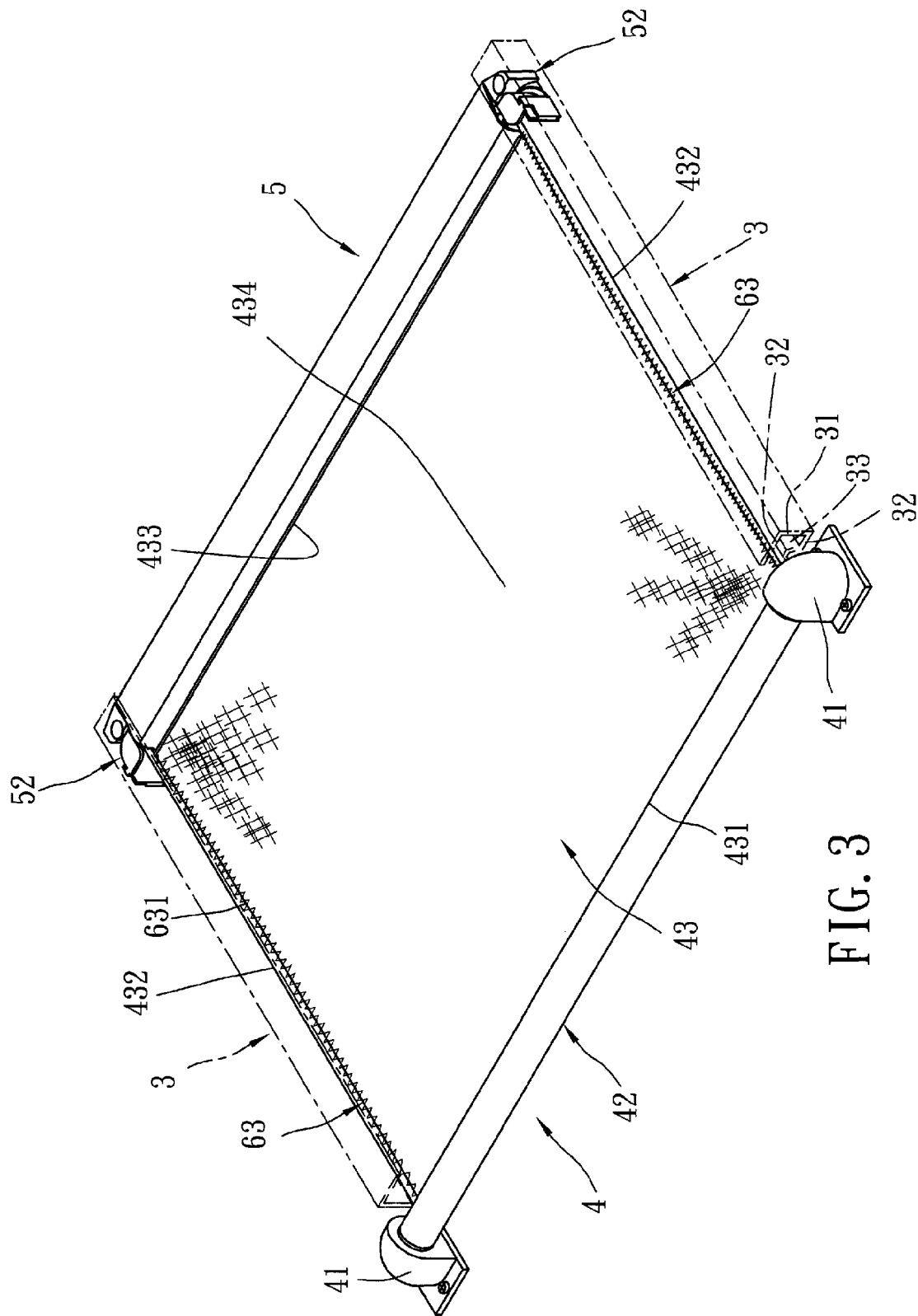
FIG. 3 is a perspective view of a first preferred embodiment of a sunshade device for a vehicle according to the present invention.
Figure 4:
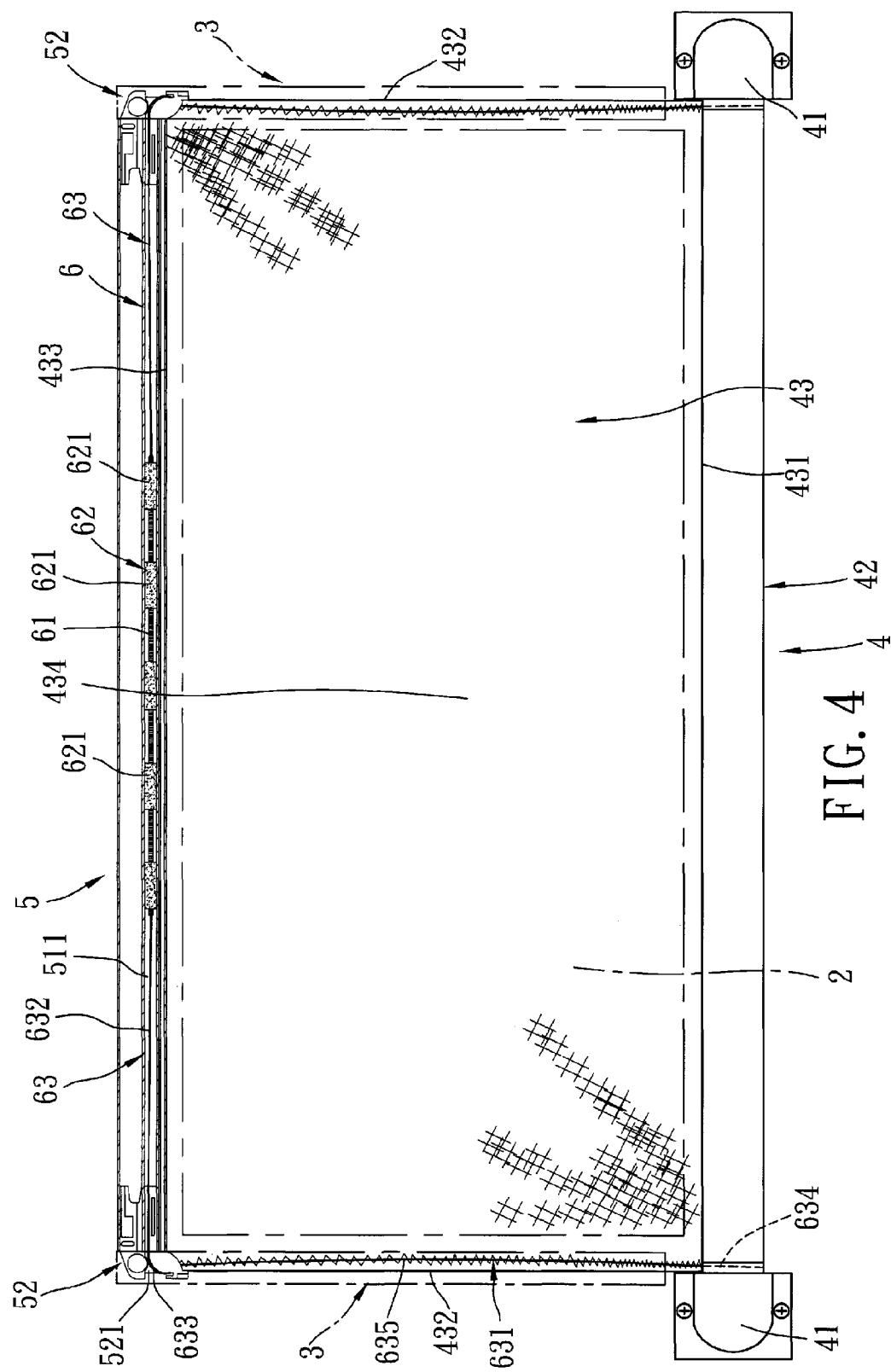
FIG. 4 is a sectional view of the first preferred embodiment of the sunshade device for a vehicle according to the present invention.
Figure 5:
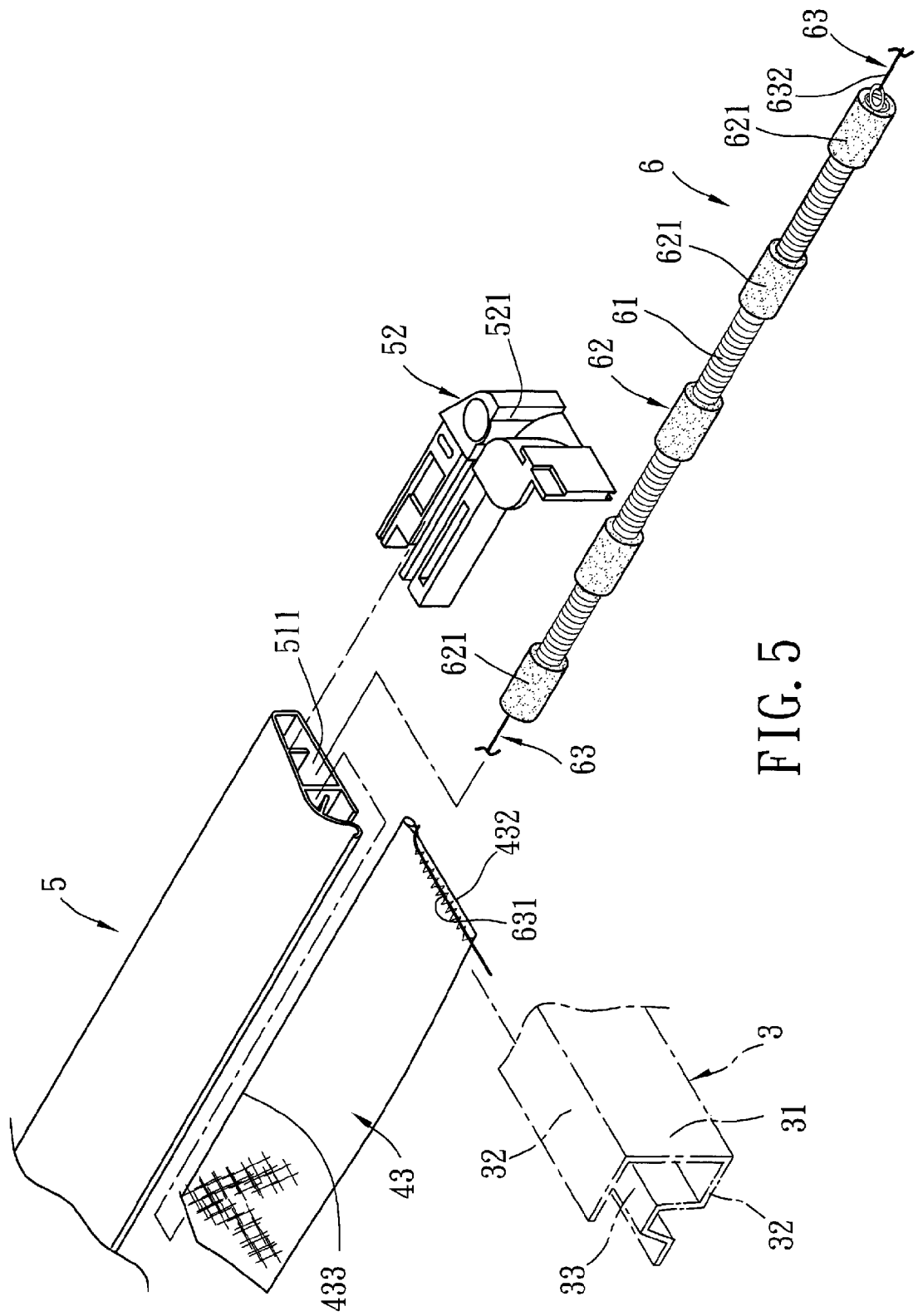
FIG. 5 is a fragmentary perspective exploded view of the first preferred embodiment of sunshade device for a vehicle according to the present invention.

Referring to FIGS. 3 to 5, the first preferred embodiment of a frame-mounted sunshade device for a vehicle of the present invention is adapted for being mounted below a vehicle roof adjacent to a dormer 2 of the vehicle. The sunshade device comprises two track rails 3, a sunshade unit 4, a cross bar 5, and a tensioning unit 6.

The track rails 3 are parallel and is disposed at two sides of the dormer 2 and fixed below the vehicle roof. Each of the track rails 3 has a base wall 31 and two sidewalls 32. The base walls 31 of the track rails 3 are positioned vertically with respect to the vehicle roof. The two sidewalls 32 of each track rail 3 extend respectively from upper and lower ends of the respective base wall 31 toward the other tack rail 3. The base walls 31 and the sidewalls 32 of each track rail 3 define the respective rail groove 33 that opens toward the other track rail 3.

The sunshade unit 4 is mounted aside the dormer 2, and includes two mounting seats 41 spaced from each other, a rewindable winding shaft assembly 42 that is connected between the mounting seats 41, and a sunshade cloth 43 that is wound around the winding shaft assembly 42 and that can be stretched out along a length direction of the track rails 3. The winding shaft assembly 42 includes a winding shaft (not shown) rotatable about its axis, and a spring (not shown) biasing the winding shaft to rotate in a winding direction. Of course, the winding shaft assembly 42 further includes other components, which are well known in the art, and therefore are not further described here. The sunshade 25 cloth 43 has two opposite lateral ends 432 inserted respectively into the rail grooves 33, a fixed end 431 fixed to the winding shaft assembly 42, and a pull end 433 interconnecting the lateral ends 432 and disposed away from the winding shaft assembly 42.

The cross bar 5 is attached to the pull end 433 and is disposed between and slidable along the track rails 3. The cross bar 5 has a longitudinal through hole 511 extending through two longitudinally opposed ends of the cross bar 5, and two end caps 52 connected respectively to the opposite ends of the cross bar 5. Each of the end caps 52 has a cord passage 521 that extends curvedly from the through hole 511 to the respective lateral end 432 of the sunshade cloth 43.

The tensioning unit 6 is disposed in the through hole 511 of the cross bar 5 and is connected to the sunshade unit 4 through the cord passages 521 of the end caps 52. The tensioning unit 6 includes a spring 61 disposed within the through hole 511, a buffer sleeve 62 disposed around the spring 61 within the through hole 511, and two tension cords 63 respectively connecting two opposite ends of the springs 61 to the winding shaft. In this embodiment, the spring 61 is an extension spring and the buffer sleeve 62 has five tubular bodies 621 made of a nonwoven cloth and spaced apart from each other. The tubular bodies 621 prevent the spring 61 from colliding with the crossbar 5 and producing noise. The material of the buffer sleeve 62 is not limited to that described in this embodiment, and any other materials that can buffer impact and reduce noise, such as foam and rubber can be employed. In addition, the number of the tubular bodies 621 can be larger or smaller than five, and may be one for example.

The tension cords 63 are high strength fine cords, such as steel wires made of a stainless steel material (SUS304). Each tension cord 63 has an intermediate section 631 attached to one of the lateral ends 432 of the sunshade cloth 43, a first end section 632 extending into the through hole 511 and connected to the spring 61, a second end section 634 connected to the winding shaft assembly 42, and a turning section 633 that extends between the intermediate section 631 and the first end section 632 and that passes movably through the cord passage 521 in the respective end cap 52. The intermediate section 631 of each of the tension cords 63 is stitched directly to one of the opposite lateral ends 432 of the sunshade cloth 43. Furthermore, the intermediate sections 631 of the tension cords 63 are curved toward each other when extending from the respective second end sections 634 in a stretching direction of the sunshade cloth 43 to a location 635 midway of a length of the intermediate sections 631. The intermediate sections 631 are curved away from each other when extending from the midway location 635 to the first end sections 632.

To install the tension cords 63, the spring 61 is first stretched to store a retraction force, and the tension cords 63 are connected to the winding shaft assembly 42 so as to apply a tension force on the tension cords 63. Because the intermediate sections 631 of the tension cords 63 extend toward and then away from each other at the midway locations 635, each intermediate section 631 makes a maximum turning at the respective midway location 635. Therefore, when the tension cords 63 are under tension, and the intermediate sections 631 at the respective midway locations 635 are straightened due to the stretching of the sunshade cloth 43, the intermediate sections 631 pull and stretch the central portion 434 of the sunshade cloth 43 in opposite directions, stretching tensely the central portion 434. Accordingly, the central portion 434 of the sunshade cloth 43 can be prevented from becoming slack downward when the sunshade cloth 43 is fully stretched out from the winding shaft assembly 42.

With the spring force of the spring 61 and the tension force of the tensioning cords 63, the opposite lateral ends 432 of the sunshade cloth 43 are not liable to escape from the track rails 3 if a user accidentally pushes up the sunshade cloth 43. Even if the upward force exerted by the user is large enough to separate the opposite lateral ends 432 temporarily from the respective rail grooves 33, the opposite lateral ends 432 can be pulled automatically back to the rail grooves 33 by means of the spring 61 and the tension force of the tensioning cords 63 when the upward force disappears. Therefore, the sunshade cloth 43 can be effectively prevented from being detached from the track rails 3.

In use, the sunshade cloth 43 is movable between a stretched position and a scrolled position. In the stretched position, the sunshade cloth 43 is extended between the track rails 3 below the dormer 2 to shield the dormer 2. On the other hand, in the scrolled position, the sunshade cloth 43 is wound around the winding shaft assembly 42. The sunshade unit 4 may be designed to enable the sunshade cloth 43 to stop at any position between the stretched position and the scrolled position. Alternatively, the sunshade unit 4 may be provided with a positioning hook to position the sunshade cloth 43 when the sunshade cloth 43 is fully stretched and permit the sunshade cloth to return to its scrolled position when there is no external force.

Since the spring 61 is received movably in the cross bar 5, the spring 61 may wobble to produce a noise when the vehicle is moving. By means of the buffer sleeve 62 disposed around the spring 61 according to the present invention, the collision of the spring 61 with the cross bar 5 and a noise produced therefrom can be prevented. Therefore, smooth travel of the sunshade cloth 43 along the track rails 3 and reduction of noises can be realized.

Figure 6:
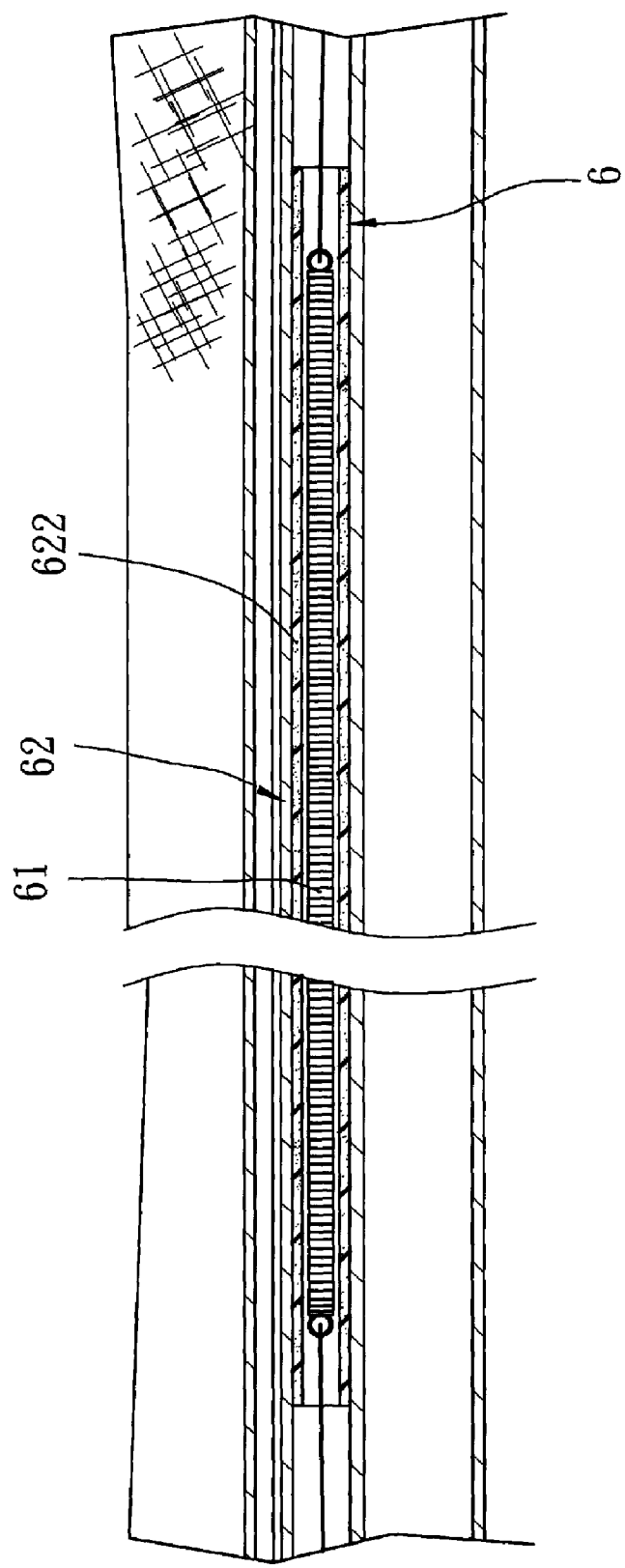
FIG. 6 is a fragmentary cross sectional view of a second preferred embodiment of a sunshade device for a vehicle according to the present invention.

Referring to FIG. 6, there is shown a second embodiment of a sunshade device of the present invention. In this embodiment, the structure of the sunshade device is similar to that of the first embodiment, except that the buffer sleeve 62 of the tensioning unit 6 has a one-piece rubber tubular body 622 disposed around the spring 61 so as to achieve the same effect as that of the first embodiment. Of course, the quantity of the tubular body 622 is not limited to one as described in this embodiment, and may be increased.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A sunshade device for a vehicle, comprising:
   two track rails respectively having rail grooves with open ends facing each other;
   a sunshade unit including a rewindable winding shaft assembly, and a sunshade cloth that is wound around said winding shaft assembly and that can be stretched out along a length direction of said track rails, said sunshade cloth having two opposite lateral ends inserted respectively into said rail grooves, and a pull end interconnecting said lateral ends and disposed away from said winding shaft assembly;
   a cross bar extending between said track rails, attached to said pull end, and having a longitudinal through hole extending through two longitudinally opposed ends of said cross bar; and
   a tensioning unit disposed in said through hole and connected to said sunshade unit, said tensioning unit including a spring disposed within said through hole, a buffer sleeve disposed around said spring, two tension cords respectively connected to two opposite ends of said spring and further connected to the winding shaft assembly, each of said tension cords having an intermediate section attached to one of said lateral ends of said sunshade cloth, a first end section connected to said spring, and a second end section connected to said winding shaft assembly.

2. The sunshade device of claim 1, wherein said buffer sleeve has at least one tubular body made of a nonwoven cloth.

3. The sunshade device of claim 1, wherein said buffer sleeve has at least one tubular body made of rubber.

4. The sunshade device of claim 1, wherein the intermediate section of each of said tension cords is stitched to the sunshade cloth.

5. The sunshade device of claim 1, wherein said intermediate sections of said tension cords are curved toward each other when extending from said second end sections of said tension cords in a stretching direction of said sunshade cloth to a location midway of a length of said intermediate sections, said intermediate sections being curved away from each other when extending to said first end sections from said location.

6. The sunshade device of claim 1, wherein said cross bar further has two end caps that are respectively connected to said opposite ends of said cross bar and that are inserted slidably and respectively into said track rails, each of said end caps having a cord passage extending curvedly from said through hole to a respective one of said opposite lateral ends, each of said tension cords further including a turning section that extends between said intermediate section and said first end section and that passes movably through said cord passage.

7. The sunshade device of claim 1, wherein said spring is an extension spring.

* * * * *